United States Patent
Xu (10) Patent No.: US 12,333,830 B2
(45) Date of Patent: Jun. 17, 2025

(54) TARGET DETECTION METHOD, DEVICE, TERMINAL DEVICE, AND MEDIUM

(71) Applicant: GUANGDONG OPPO MOBILE TELECOMMUNICATIONS CORP., LTD., Dongguan (CN)

(72) Inventor: Yi Xu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 344 days.

(21) Appl. No.: 17/836,898

(22) Filed: Jun. 9, 2022

(65) Prior Publication Data

US 2022/0309761 A1    Sep. 29, 2022

Related U.S. Application Data

(63) Continuation of application No. PCT/CN2020/114034, filed on Sep. 8, 2020.

(Continued)

(51) Int. Cl.
*G06K 9/00* (2022.01)
*G06T 7/73* (2017.01)
(Continued)

(52) U.S. Cl.
CPC ............... *G06V 20/64* (2022.01); *G06T 7/74* (2017.01); *G06V 10/25* (2022.01); *G06V 10/40* (2022.01); *G06V 20/10* (2022.01); *G06T 2207/10028* (2013.01); *G06T 2207/30244* (2013.01); *G06V 2201/07* (2022.01)

(58) Field of Classification Search
CPC ........................................... G06T 2207/10028
See application file for complete search history.

(56) References Cited

U.S. PATENT DOCUMENTS 9,807,365 B2 * 10/2017 Cansizoglu .......... H04N 13/207
10,430,691 B1    10/2019 Kim et al.
(Continued)

FOREIGN PATENT DOCUMENTS

| CN | 104143194 A | 11/2014 |
| CN | 103247041 B | 2/2016 |

(Continued)

OTHER PUBLICATIONS

Extended European Search Report dated Jan. 2, 2023 received in European Patent Application No. EP20898408.8.
(Continued)

*Primary Examiner* — Hadi Akhavannik
(74) *Attorney, Agent, or Firm* — Sheppard, Mullin, Richter & Hampton LLP (57) ABSTRACT

The present disclosure provides a target detection method. The method includes: acquiring a scene image of a scene; acquiring a three-dimensional point cloud corresponding to the scene; identifying a supporting plane in the scene based on the three-dimensional point cloud; generating a plurality of region proposals based on the scene image and the supporting plane; and performing a target detection on the plurality of region proposals to determine a target object to be detected in the scene image. In addition, the present disclosure also provides a target detection device, a terminal device, and a medium.

17 Claims, 6 Drawing Sheets

Related U.S. Application Data (60) Provisional application No. 62/947,419, filed on Dec. 12, 2019.

(51) Int. Cl.
  G06V 10/25 (2022.01)
  G06V 10/40 (2022.01)
  G06V 20/10 (2022.01)
  G06V 20/64 (2022.01)

(56) References Cited

U.S. PATENT DOCUMENTS

| | | | |
|---|---|---|---|
| 10,740,920 B1* | 8/2020 | Ebrahimi Afrouzi | ............................ G05D 1/0274 |
| 2014/0192050 A1 | 7/2014 | Qiu et al. | |
| 2017/0243352 A1* | 8/2017 | Kutliroff | ............... G06T 19/006 |
| 2018/0144458 A1 | 5/2018 | Xu et al. | |
| 2018/0322623 A1* | 11/2018 | Memo | ................... G06N 3/084 |
| 2018/0330149 A1 | 11/2018 | Uhlenbrock et al. | |
| 2019/0147245 A1 | 5/2019 | Qi et al. | |
| 2019/0163958 A1 | 5/2019 | Li et al. | |
| 2019/0287258 A1 | 9/2019 | Mano et al. | |
| 2020/0048045 A1 | 2/2020 | Xiong et al. | |
| 2020/0160487 A1 | 5/2020 | Kanzawa et al. | |
| 2021/0090242 A1 | 3/2021 | Hever et al. | |
| 2021/0192793 A1 | 6/2021 | Engelland-gay et al. | |
| 2022/0020215 A1 | 1/2022 | Banerjee et al. | |
| 2024/0427144 A1 | 12/2024 | Kern et al. | |

FOREIGN PATENT DOCUMENTS

| | | |
|---|---|---|
| CN | 106529573 A | 3/2017 |
| CN | 107291093 A | 10/2017 |
| CN | 108133191 A | 6/2018 |
| CN | 108491818 A | 9/2018 |
| CN | 108710818 A | 10/2018 |
| CN | 109145677 A | 1/2019 |
| CN | 109345510 A | 2/2019 |
| CN | 109670517 A | 4/2019 |
| CN | 109816664 A | 5/2019 |
| CN | 110032962 A | 7/2019 |
| CN | 110110802 A | 8/2019 |
| CN | 110400304 A | 11/2019 |
| WO | 2019144300 A1 | 8/2019 |

OTHER PUBLICATIONS

Georgios Georgakis et al:"Multiview RGB-D Dataset for Object Instance Detection" ,2016 Fourth International Conference on 3DVision(3DV), Sep. 26, 2016 (Sep. 26, 2016) ,pp. 426-434, XP055548477.

International Search Report and Written Opinion dated Dec. 11, 2020 in International Application No. PCT/CN2020/114034.

Dry goods _ Introduction to target detection, reading this is enough (completed)—Programmer Sought; https://zhuanlan.zhihu.com/p/34142321.

A Survey of Object Detection Algorithms Based on Deep Learning; https://zhuanlan.zhihu.com/p/33981103.

Ross Girshick et al. "Rich feature hierarchies for accurate object detection and semantic segmentation", 2014 IEEE Conference on Computer Vision and Pattern Recognition.

"Fast R-CNN", Ross Girshick Microsoft Research, 2015.

Uijlings et al. "Selective Search for Object Recognition".

Shaoqing Ren et al. "Faster R-CNN: Towards Real Time Object Detection with Region Proposal Networks", 2016.

Joseph Redmon et al. "You Only Look Once: Unified, Real-Time Object Detection", 2015

Wei Liu et al. "SSD: Single Shot Multibox Detector", 2015.

The First Office Action from corresponding Chinese Application No. 202080084583.4 dated Jun. 26, 2024.

Ren et al., "3D Object Detection with Latent Support Surfaces", 2018 IEEE/CVF Conference on Computer Vision and Pattern Recognition, Abstract, Sections 1 and 4, Dec. 6, 2018.

Du, "Research and Implementation of Indoor Scene Real-time Segmentation Algorithm Based on the Depth and Color Data", China Excellent Master's Degree Thesis Full-text Database Information Technology Series, Issue 05, May 31, 2019.

Chinese Second Office Action, Chinese Application No. 202080084583.4, mailed on Nov. 27, 2024 (14 pages).

Nguyen et al., "3D Point Cloud Segmentation: A survey", IEEE, 2013.

Chinese Rejection decision for Chinese Application No. 202080084583.4, mailed Feb. 20, 2025 (15 pages).

Non-Final Office Action for U.S. Appl. No. 17/837,165, mailed Jan. 2, 2025 (62 pages).

European Examination Report for European Application No. 20898408.8 mailed Mar. 13, 2025 (5 pages).

International Search Report and Written Opinion, International Application No. PCT/CN2020/114063, mailed Dec. 8, 2020 (9 pages).

\* cited by examiner

TARGET DETECTION METHOD, DEVICE, TERMINAL DEVICE, AND MEDIUM

CROSS-REFERENCE TO RELATED APPLICATION

This application is a continuation of International Application No. PCT/CN2020/114034, filed on Sep. 8, 2020, which claims priority to and benefits of U.S. Patent Application Ser. No. 62/947,419, filed with the United States Patent and Trademark Office on Dec. 12, 2019, the entire contents of both of which are incorporated herein by reference.

TECHNICAL FIELD

The present disclosure relates to a field of image recognition technology, and more particularly, to a target detection method, a target detection device, a terminal device, and a medium.

BACKGROUND

Specific objects such as faces or cars in an image can be detected through a target detection, which is widely used in a field of image recognition technology.

Currently, a mainstream target detection method is to divide a detection process into two stages. The first stage is to extract a number of regions (i.e., region proposals) that may include target objects based on an image by using a region proposal generation method. The second stage is to perform a feature extraction on the extracted region proposals, and then identify categories of the target objects in each of the region proposals by a classifier.

In the related art, during the target detection, methods such as a sliding window method, a selective search method, and a deep learning method are usually adopted in the first stage to generate the region proposals, which may cause generation of unreasonable redundant region proposals. For example, when the target object is a sofa and a generated region proposal may correspond to a ceiling in the image, since it is not likely for the sofa to be placed on the ceiling, it is unlikely that the generated region proposal includes the sofa. Therefore, when the region proposals are generated in the above manners, it is easy to cause waste of computing resources and computing time during subsequent feature extraction and other operations on the region proposals due to redundant region proposals.

SUMMARY

Embodiments of the present disclosure provide a target detection method, a target detection device, a terminal device, and a computer readable storage medium, for the purpose of solving the following technical problems in the related art. The conventional target detection method may generate some unreasonable redundant region proposals, which may result in waste of computing resources and computing time during subsequent feature extraction and other operations on the region proposals due to redundant region proposals.

Accordingly, embodiments of a first aspect of the present disclosure provide a target detection method. The method includes: acquiring a scene image of a scene; acquiring a three-dimensional point cloud corresponding to the scene; identifying a supporting plane in the scene based on the three-dimensional point cloud; generating a plurality of region proposals based on the scene image and the supporting plane; and performing a target detection on the plurality of region proposals to determine a target object to be detected in the scene image.

Embodiments of a second aspect of the present disclosure provide a target detection device. The device includes: a first acquiring module, configured to acquire a scene image of a scene; a second acquiring module, configured to acquire a three-dimensional point cloud corresponding to the scene; an identifying module, configured to identify a supporting plane in the scene based on the three-dimensional point cloud; a processing module, configured to generate a plurality of region proposals based on the scene image and the supporting plane; and a detecting module, configured to perform a target detection on the plurality of region proposals to determine a target object to be detected in the scene image.

Embodiments of a third aspect of the present disclosure provide a terminal device, including: a memory, a processor, and computer programs stored in the memory and executable by the processor. When the processor executes the computer programs, the target detection method according to embodiments of the first aspect is implemented.

Embodiments of a fourth aspect of the present disclosure provide a computer readable storage medium, storing computer programs therein. When the computer programs are executed by a processor, the target detection method according to embodiments of the first aspect is implemented.

The technical solution disclosed in the present disclosure has the following beneficial effects.

During the target detection on the scene image, the supporting plane in the scene is identified based on the three-dimensional point cloud corresponding to the scene, and then a plurality of region proposals are generated based on the scene image and the supporting plane. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

Currently, a mainstream target detection method is to divide the detection process into two stages. The first stage is to extract a number of regions (i.e., region proposals) that may include target objects based on an image by using a region proposal generation method. The second stage is to perform feature extraction on the extracted region proposals, and then identify categories of the target objects in each of the region proposals by a classifier.

In the related art, during the target detection, methods such as a sliding window method, a selective search method, and a deep learning method are usually adopted in the first stage to generate the region proposals, which may cause generation of unreasonable redundant region proposals. For example, when the target object is a sofa and a generated region proposal may correspond to a ceiling in the image, since it is not likely for the sofa to be placed on the ceiling, it is unlikely that the generated region proposal includes the sofa. Therefore, when the region proposals are generated in the above manners, it is easy to cause waste of computing resources and computing time during subsequent feature extraction and other operations on the region proposals due to redundant region proposals.

Embodiments of the present disclosure provide a target detection method for solving the above technical problems. The method includes: acquiring a scene image of a scene; acquiring a three-dimensional point cloud corresponding to the scene; identifying a supporting plane in the scene based on the three-dimensional point cloud; generating a plurality of region proposals based on the scene image and the supporting plane; and performing a target detection on the plurality of region proposals to determine a target object to be detected in the scene image. Therefore, during the target detection, the supporting plane in the scene is identified based on the sparse three-dimensional point cloud corresponding to the scene, and then a plurality of region proposals are generated based on the scene image and the supporting plane. In this way, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

A target detection method, a target detection device, a terminal device, and a computer readable storage medium are described below with reference to the attached drawings.

Figure 1:
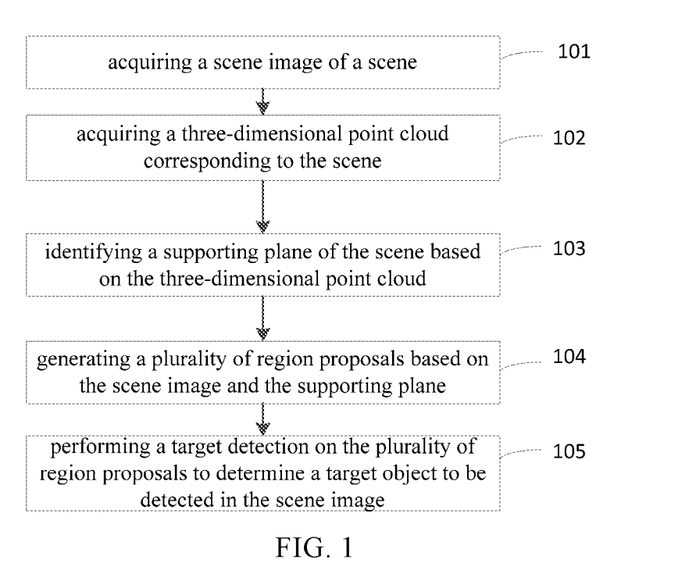
FIG. 1 is a flow chart of a target detection method according to an embodiment of the present disclosure.

The target detection method according to the embodiments of the present disclosure is described specifically below in combination with FIG. 1. FIG. 1 is a flow chart of a target detection method according to an embodiment of the present disclosure.

As illustrated in FIG. 1, the target detection method according to the present disclosure may include the following acts.

At block 101, a scene image of a scene is acquired.

In detail, the target detection method according to the present disclosure may be executed by the target detection device according to the present disclosure. The target detection device may be configured in a terminal device for performing target detection on the scene image of the scene. The terminal device according to the embodiments of the present disclosure may be any hardware device capable of data processing, such as a smart phone, a tablet computer, a robot, and a wearable device like a head mounted mobile device.

It is understood that a camera can be configured in the terminal device to take the scene image of the scene.

The scenario may be an actual scenario or a virtual scenario, which is not limited herein. The scene image may be static or dynamic, which is not limited herein.

At block 102, a three-dimensional point cloud corresponding to the scene is acquired.

In detail, the three-dimensional point cloud corresponding to the scene may be generated by scanning the scene using a simultaneous localization and mapping (SLAM) system, or a dense three-dimensional point cloud corresponding to the scene may be acquired by a depth camera, or the three-dimensional point cloud of the scene may be acquired by other methods, which is not limited herein.

At block 103, a supporting plane in the scene is identified based on the three-dimensional point cloud.

The supporting plane is a plane used to place actual objects or virtual objects in the scene.

It can be understood that in real life, objects such as sofas, tables, and chairs are usually placed on the ground. Objects such as cars and trees are usually located on the ground. Objects such as murals and clocks are usually hung on the wall. In other words, a horizontal plane or a vertical plane is usually used as a supporting plane to place objects. Therefore, the present disclosure can use a horizontal plane or a vertical plane as the supporting plane.

Correspondingly, an act at block 103 can be realized by identifying a horizontal plane or a vertical plane in the scene based on the three-dimensional point cloud, and determining the horizontal plane or the vertical plane as the supporting plane.

In detail, it is possible to select a plane facing a certain orientation as the supporting plane depending on a category of the target object to be detected. For example, when the target object to be detected is an object such as a sofa, a table, a chair or the like that needs to be placed on a horizontal plane, the horizontal plane is used as the supporting plane. When the target object to be detected is an object such as a mural, a clock, or the like that needs to be placed on a vertical plane, the vertical plane is used as the supporting plane.

When the supporting plane in the scene is identified, the information of the identified supporting plane may include information such as the position and orientation of the supporting plane.

At block 104, a plurality of region proposals are generated based on the scene image and the supporting plane.

In detail, after the supporting plane is identified, a possible position of the region proposal can be determined according to the position and orientation of the supporting plane and a possible position of the target object to be detected, and a size of the region proposal may be determined according to a size of the target object, such that a plurality of region proposals can be generated.

For example, if the target object is a sofa and the supporting plane is a horizontal plane, since the sofa is usually placed on the ground rather than suspended in the air, the region proposals can be determined as positioned above the horizontal plane according to the position and orientation of the supporting plane and the possibility that the sofa may appear on the ground, and then according to the size of the sofa, a plurality of regions corresponding to the size of the sofa above the horizontal plane can be determined as the plurality of region proposals.

It should be noted that, since the present disclosure generates region proposals based on the scene image and the supporting plane, the generated region proposals may not appear in an unreasonable region. For example, when the target object is a sofa, the generated region proposals are not located on the ceiling of the scene image. Therefore, with the present disclosure, the generated region proposals may be more accurate and the number of generated region proposals may be greatly reduced.

At block 105, a target detection is performed on the plurality of region proposals to determine a target object to be detected in the scene image.

In detail, after forming the plurality of region proposals, a feature map of the plurality of region proposals may be extracted by using a neural network. A classification method is adopted to identify categories of the objects in each region proposal. A bounding box regression is performed for each object to determine the size of each object. In this way, the target detection can be realized on the plurality of region proposals, thereby determining the target object to be detected in the scene image.

The neural network used for extracting the feature map of region proposals may be any neural network for extracting features, any neural network for classifying images can be used to determine the category of the object, and when the bounding box regression is performed, any neural network for bounding box regression can be utilized, which are not limited herein.

It can be understood that the target detection method according to the embodiments of the present disclosure can be applied to an AR software development kit (SDK) to provide a target detection function, and a developer can utilize the target detection function in the AR SDK to realize the recognition of objects in the scene, and further realize various functions, such as product recommendation in the e-commerce field.

With the target detection method according to embodiments of the present disclosure, a scene image of a scene is acquired, a three-dimensional point cloud corresponding to the scene is acquired, a supporting plane in the scene is identified based on the three-dimensional point cloud, and a plurality of region proposals are generated based on the scene image and the supporting plane, further a target detection is performed on the plurality of region proposals to determine a target object to be detected in the scene image. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

Figure 2:
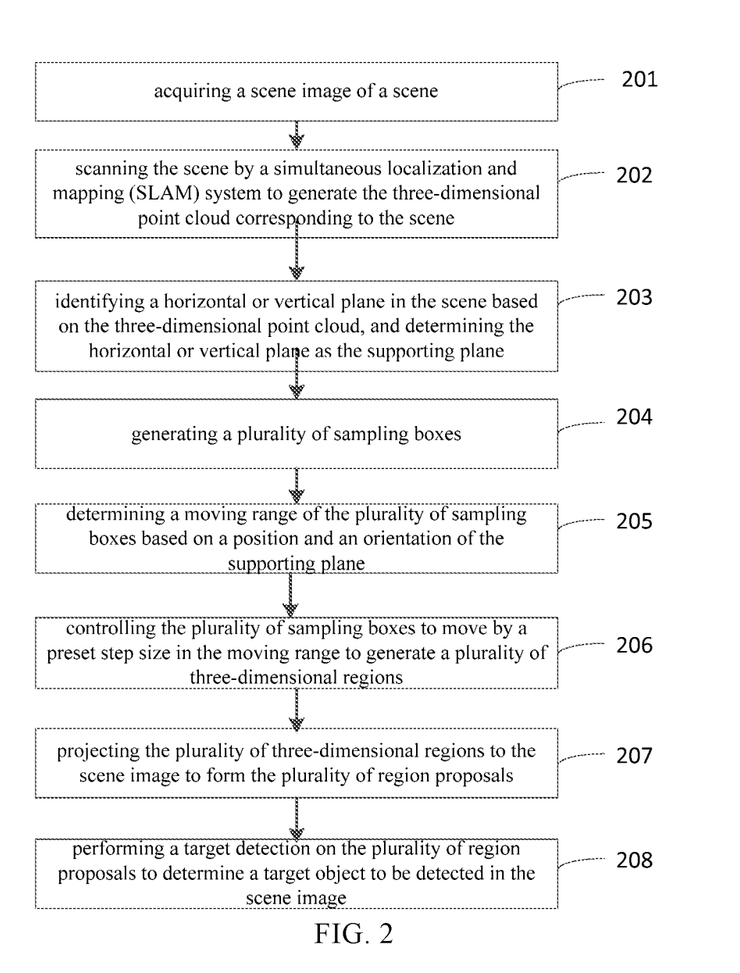
FIG. 2 is a flow chart of a target detection method according to another embodiment of the present disclosure.

The target detection method according to embodiments of the present disclosure is further described below with reference to FIG. 2. FIG. 2 is a flow chart of a target detection method according to another embodiment of the present disclosure.

As illustrated in FIG. 2, the target detection method according to an embodiment of the present disclosure may include the following acts.

At block 201, a scene image of a scene is acquired.

At block 202, the scene is scanned by a simultaneous localization and mapping (SLAM) system to generate a three-dimensional point cloud corresponding to the scene.

The SLAM system utilized in the embodiment of the present disclosure will be briefly described below.

The SLAM system, as its name implies, enables both positioning and map construction. When a user holds or wears a terminal device and starts from an unknown location in an unknown environment, the SLAM system in the terminal device estimates a position and a pose of the camera at each moment based on feature points observed by the camera during the movement, and fuses image frames acquired at different times by the camera to reconstruct a complete three-dimensional map of the scene around the user. The SLAM system is widely used in robot positioning navigation, virtual reality (VR), augmented reality (AR), drone, and unmanned driving. The position and the pose of the camera at each moment can be represented by a matrix or a vector containing rotation and translation information.

The SLAM systems can be generally divided into a visual front-end module and an optimizing back-end module.

The main tasks of the visual front-end module are solving a camera pose transformation between adjacent frames through a feature matching by using the image frames acquired by the camera at different times during the movement, and realizing a fusion of the image frames to reconstruct a map.

The visual front-end module relies on the terminal device such as a sensor installed in a robot or a smart phone. Common sensors include cameras (such as monocular cameras, binocular cameras, TOF cameras), inertial measurement units (IMUs), and laser radars, are configured to collect various types of raw data in the actual environment, including laser scanning data, video image data, and point cloud data.

The SLAM system's optimizing back-end module is mainly to optimize and fine-tune the inaccurate camera pose and the reconstruction map obtained by the visual front-end module, which can be separated from the visual front-end module as an offline operation or integrated into the visual front-end module.

In a specific implementation, the SLAM system can be used to obtain the three-dimensional point cloud corresponding to the scene by using the following implementation manners.

In detail, the camera included in the terminal device may be calibrated in advance to determine internal parameters of the camera, the scene is scanned using the calibrated camera, and the 3D point cloud corresponding to the scene is generated by using the SLAM system.

To calibrate the camera, one can print a 7*9 black and white calibration board on an A4 paper, and a size of one checkerboard of the calibration board is measured as 29.1 mm. The calibration board is posted on a neat and flat wall, and a video is shot against the calibration board using the camera to be calibrated. During the shooting, the camera is continuously moved to shoot the calibration board from different angles and at different distances. A calibration program is written using OpenCV packaged algorithm functions. The video is converted into images, and 50 of the images are selected as calibration images which are inputted into the calibration program together with basic parameters of the calibration board, and the internal parameters of the camera can be calculated.

A point in a world coordinate system is measured in terms of physical length dimensions, and a point in an image plane is measured in pixels. The inner parameters are used to make a linear transformation between the two coordinate systems. A point Q (X, Y, Z) in a space can be transformed by the inner parameter matrix to obtain a corresponding point q (u, v) of the point under the pixel coordinate system that is projected on the image plane through the ray:

$$Z\begin{bmatrix}u\\v\\1\end{bmatrix} = K\begin{bmatrix}X\\Y\\Z\end{bmatrix}.$$

K is the inner parameter matrix of the camera.

$$K = \begin{bmatrix}\frac{f}{dx} & 0 & u_0\\0 & \frac{f}{dy} & v_0\\0 & 0 & 1\end{bmatrix},$$

in which, f is a focal length of the camera in units of millimeters, dx and dy respectively represent a length and a width of each pixel in units of millimeters, $u_0$, $v_0$ represent coordinates of a center of the image usually in units of pixels.

According to the inner parameters of the camera and a height and a width of the scene image obtained when the camera is shooting the scene, a camera parameter file is written according to a format required by a DSO program, and the camera parameter file is used as an input to start the DSO program. In other words, the 3D point cloud of the scene can be constructed in real time when the camera is used to scan the scene.

It should be noted that the foregoing method is only an implementation manner of scanning the scene by the SLAM system to generate the three-dimensional point cloud corresponding to the scene. In an actual application, the SLAM system may be used to generate the three-dimensional point cloud corresponding to the scene by using any other method, which is not limited therein.

In addition, in the foregoing embodiments, the SLAM system is used to scan the scene to generate the three-dimensional point cloud corresponding to the scene. In an actual application, a dense three-dimensional point cloud corresponding to the scene may be acquired by a depth camera, or the three-dimensional point cloud of the scene may be acquired by using other methods, which is not limited therein.

At block 203, a horizontal plane or a vertical plane in the scene is identified based on the three-dimensional point cloud, and the horizontal plane or the vertical plane is determined as the supporting plane.

When the supporting plane in the scene is identified, the information of the identified supporting plane may include information such as a position and an orientation of the supporting plane.

In the specific implementation, the supporting plane in the scene can be identified based on the three-dimensional point cloud in various ways.

For example, in an example embodiment, the supporting plane in the scene may be identified by a Random Sample Consensus (RANSAC) algorithm, an input of the algorithm is the three-dimensional point cloud, and an output is the identified supporting plane. For each time, a plurality of three-dimensional points are randomly taken from the three-dimensional point cloud and used to determine a plane. The present disclosure takes three three-dimensional points as an example. It is determined how many three-dimensional points of all three-dimensional points in the inputted three-dimensional point cloud are on the plane, and the number of the three-dimensional points on the plane is recorded. This process is repeated for N times to obtain N planes. The plane having the largest number of points with a desired orientation is output as the supporting plane.

A preset threshold may be set, distances of all three-dimensional points in the three-dimensional point cloud to a certain plane may be calculated, and the three-dimensional point whose distance is less than the preset threshold is determined as the three-dimensional point on the plane.

It should be noted that, when identifying a supporting plane with a specific orientation such as a horizontal plane or a vertical plane in the scene, since the identification algorithm randomly selects three-dimensional points to determine the plane, the determined planes may have different orientations. If the identification algorithm determines the number of three-dimensional points on each randomly determined plane, redundant calculations may be caused. In the embodiments of the present disclosure, the identification algorithm may be set to determine the number of three-dimensional points on the plane with the specific orientation to identify the supporting plane in the scene, thereby avoiding redundant calculations and improving a speed of identifying the supporting plane.

In a specific implementation, since the current SLAM system is usually based on visual-inertial odometry (VIO), the VIO-based SLAM system can obtain the gravity direction by simultaneously processing a visual signal and an inertial measurement unit (IMU). Therefore, when identifying a plane with a specific orientation in the scene, the specific orientation to be identified can be defined by the known gravity direction. For example, when identifying a horizontal plane in the scene, the orientation of the horizontal plane can be defined by the known gravity direction, therefore the identification algorithm can ignore all planes that are not perpendicular to the gravity direction but only determine the number of three-dimensional points on each of the planes perpendicular to the gravity direction that are determined according to the randomly selected three-dimensional points, and further determine the plane having the most number of 3d points as the supporting plane.

In practical applications, the supporting plane in the scene can be identified based on the three-dimensional point cloud by other means, which is not limited herein.

Further, after the supporting plane in the scene is identified, a plurality of region proposals may be generated based on the scene image and the supporting plane in the following manner.

At block 204, a plurality of sampling boxes are generated. The sampling box is a three-dimensional virtual area whose size and shape can be set according to a size and a shape of the target object to be detected. For example, if the target object to be detected is a cuboid, and the length, the width, and the height are 1 m, 1 m, and 0.6 m, respectively, the sampling box can be set as a cuboid with the size of 1 m*1 m*0.6 m.

When the plurality of sampling boxes are generated, the target object of interest to the user may be acquired, parameters of the target object of interest are acquired, and parameters of the sampling boxes are generated according to the parameters of the target object of interest.

The parameters of the sampling box may include the size and the shape of the sampling box.

It should be noted that, for the target objects with the same type, the parameters may be different. For example, when the target object is a single sofa, the length, the width and the height of the single sofa may be 1 m, 1 m, 0.6 m, or may be 1 m, 1 m, 0.7 m, or may be 0.8 m, 1 m, 0.6 m. In the embodiments of the present disclosure, a plurality of sampling boxes having different parameters may be generated to obtain a relatively accurate region proposal.

At block 205, a moving range of the plurality of sampling boxes is determined based on a position and an orientation of the supporting plane.

At block 206, the plurality of sampling boxes are controlled to move by a preset step size in the moving range to generate a plurality of three-dimensional regions.

In detail, after identifying the supporting plane in the scene, the moving range of the plurality of sampling boxes when moving in the three-dimensional space where the supporting plane is located may be determined based on the position and the orientation of the supporting plane and a possible area of the region proposal in the scene image. The plurality of sampling boxes are controlled to move according to the preset step size within a determined moving range to generate the plurality of three-dimensional regions.

For example, when the target object is a sofa and the supporting plane is a horizontal plane, since the sofa is usually placed on the ground rather than suspended in the air, it can be determined that the region proposal in the scene image may be above the horizontal plane, so that it can be determined according to the position of the horizontal plane, the moving range A of the plurality of sampling boxes is a three-dimensional region above the supporting plane in the three-dimensional space where the supporting plane is located, and the plurality of sampling boxes can be controlled to move in the moving range A by the preset step size.

Alternatively, when the target object is a mural and the supporting plane is a vertical plane, since the mural is usually hung on the wall rather than suspended in the air far away the wall, it can be determined that the region proposal in the scene image may be located near the vertical plane. If the vertical plane is located in the right half of the entire scene, according to the position of the vertical plane, a moving range B of the plurality of sampling boxes can be determined as the three-dimensional region near the left side of the vertical plane in the three-dimensional space where the vertical plane is located, so that the plurality of sampling boxes can be controlled to move in the moving range B by the preset step size.

When specifically controlling the movement of the plurality of sampling boxes, each sampling box can be separately controlled to move by the preset step size to generate the plurality of three-dimensional regions. Each sampling box moves to a position in three-dimensional space, and the area occupied by the sampling box is configured as a three-dimensional region.

The preset step size can be arbitrarily set as needed, such as, 0.5 meters, or 0.2 meters.

In a specific implementation, the sampling box may be moved horizontally from left to right and then vertically from top to bottom, or may be moved in other manners, which is not limited herein.

Figure 3:
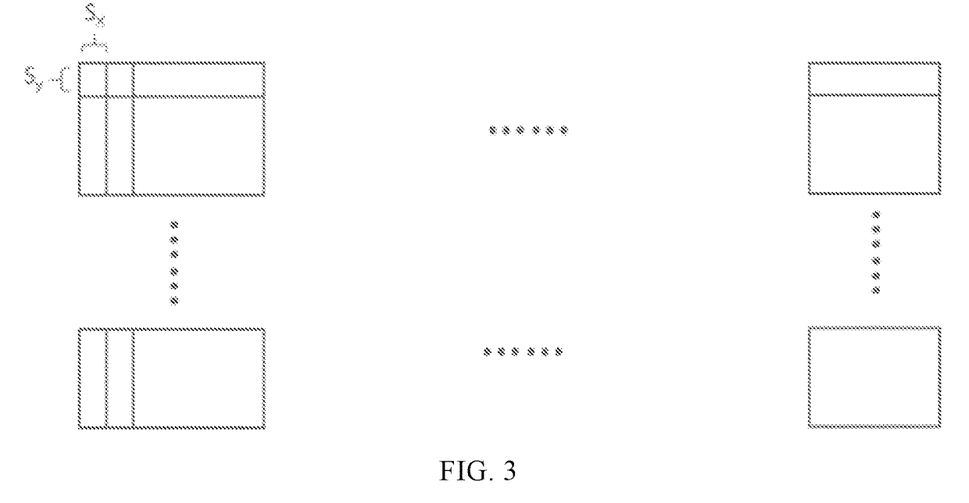
FIG. 3 is a schematic diagram of a process of generating several three-dimensional regions according to an embodiment of the present disclosure.

For example, if the generated sampling box A is a cuboid, FIG. 3 is a front view when the sampling box A is moved by the preset step size. As illustrated in FIG. 3, the sampling box A can be moved by the preset step size $S_x$ from left to right, and then downwards by the preset step size $S_y$, and further moved from left to right again until the moving range is filled with the generated 3D area.

In addition, the smaller the preset step size, the more region proposals generated, the longer the computing time for subsequent feature extraction and other operations on the region proposals, the more computing resource consumed, such that the computing time of the target detection is longer and more computing resource is consumed. Therefore, the step size can be set according to the computing time of the target detection and the requirement of the computing resources.

At block 207, the plurality of three-dimensional regions are projected to the scene image to form the plurality of region proposals.

Further, after generating the plurality of three-dimensional regions, the position and pose of the camera when the scene image is captured can be determined by the SLAM system or any other means and used to project each three-dimensional region into the scene image to obtain the two-dimensional bounding box corresponding to the three-dimensional region. Each two-dimensional bounding box is configured as a region proposal, so that the plurality of region proposals can be generated.

Figure 4:
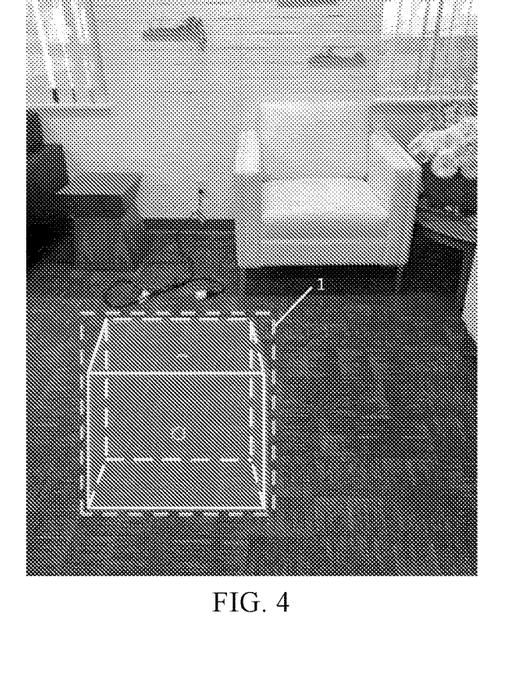
FIG. 4 is a schematic diagram of a process of generating region proposals according to an embodiment of the present disclosure.

For example, suppose that FIG. 4 is a scene image taken by a camera, and the supporting plane is a horizontal plane. The cube in FIG. 4 is considered as a three-dimensional region generated by moving the sampling box on the supporting plane by the preset step size, and according to the position and pose of the camera when the scene image shown in FIG. 4 is captured that can be determined by the SLAM system, after the cube is projected to the scene image, the two-dimensional bounding box corresponding to the cube (shown by the dashed box 1 in FIG. 4) is configured as a region proposal.

Figure 5:
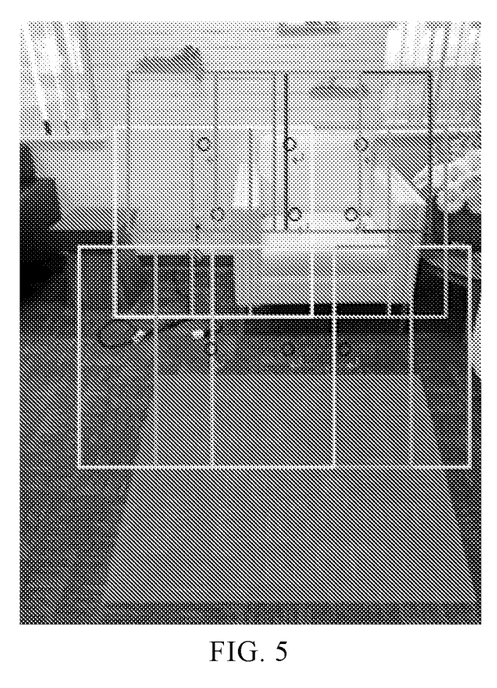
FIG. 5 is a schematic diagram of generated region proposals according to an embodiment of the present disclosure.
Figure 6:
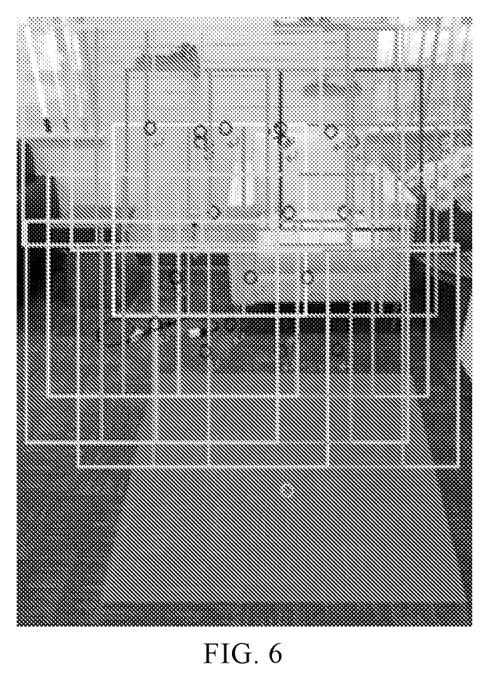
FIG. 6 is a schematic diagram of generated region proposals in the related art.

As illustrated in FIG. 5, after the plurality of three-dimensional regions are respectively projected to the scene image according to the method provided in the embodiments of the present disclosure, the plurality of region proposals can be formed. According to a usual selective search method, the region proposals formed are illustrated in FIG. 6.

By comparison, it can be seen that since the present disclosure generates the region proposal based on the scene image and the supporting plane, the generated region proposal does not appear in an unreasonable region. For example, when the target object is a sofa, the generated region proposal is not located on the ceiling in the scene image. Therefore, with the present disclosure, the generated region proposals can be more accurate and the number of generated region proposals can be greatly reduced.

It should be noted that when each three-dimensional region is projected to the scene image, coordinate conversion can be adopted to project each three-dimensional region to the scene image by converting a coordinate of a three-dimensional point in a three-dimensional region from an object coordinate system to a world coordinate system, a camera coordinate system, a projection coordinate system, and an image coordinate system sequentially. After projection, a two-dimensional bounding box corresponding to a three-dimensional region is configured as the region proposal, so that the plurality of region proposals can be generated.

At block 208, a target detection is performed on the plurality of region proposals to determine a target object to be detected in the scene image.

In detail, after forming the plurality of region proposals, a feature map of the plurality of region proposals may be extracted by using a neural network, a classification method is used to identify categories of the objects in each region proposal, and a bounding box regression is performed for each object to determine the size of each object. In this way, the target detection can be realized on the plurality of region proposals, thereby determining the target object to be detected in the scene image.

The neural network used for extracting the feature map of the region proposals may be any neural network for extracting features, any neural network for classifying images can be used to determine the category of the object, and when the bounding box regression is performed, any neural network for bounding box regression can be utilized, which are not limited herein.

With the target detection method according to embodiments of the present disclosure, a scene image of a scene is acquired, the scene is scanned by a simultaneous localization and mapping (SLAM) system to generate a three-dimensional point cloud corresponding to the scene. A horizontal plane or a vertical plane in the scene is identified according to the three-dimensional point cloud, and the horizontal or vertical plane is determined as a supporting plane. A plurality of sampling boxes are generated, a moving range of the plurality of sampling boxes is determined according to a position and orientation of the supporting plane, and the plurality of sampling boxes are controlled to move by a preset step size in the moving range to generate a plurality of three-dimensional regions. The plurality of three-dimensional regions are projected to the scene image to form a plurality of region proposals, and a target detection is performed on the plurality of region proposals to determine a target object to be detected in the scene image. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

Figure 7:
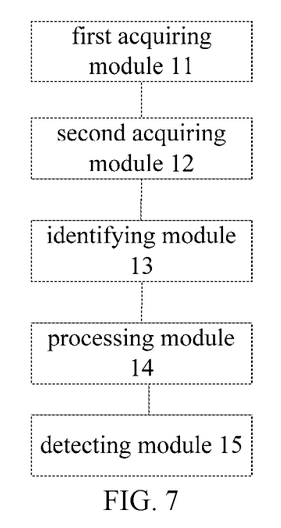
FIG. 7 is a block diagram of a target detection device according to an embodiment of the present disclosure.

The target detection device according to embodiments of the present disclosure is described below in combination with FIG. 7. FIG. 7 is a block diagram of a target detection device according to an embodiment of the present disclosure.

As illustrated in FIG. 7, the target detection device includes a first acquiring module 11, a second acquiring module 12, an identifying module 13, a processing module 14, and a detecting module 15.

The first acquiring module 11 is configured to acquire a scene image of a scene.

The second acquiring module 12 is configured to acquire a three-dimensional point cloud corresponding to the scene.

The identifying module 13 is configured to identify a supporting plane in the scene based on the three-dimensional point cloud.

The processing module 14 is configured to generate a plurality of region proposals based on the scene image and the supporting plane.

The detecting module 15 is configured to perform a target detection on the plurality of region proposals to determine a target object to be detected in the scene image.

In an example embodiment, the second acquiring module 12 is configured to scan the scene by a simultaneous localization and mapping (SLAM) system to generate the three-dimensional point cloud corresponding to the scene.

In detail, the target detection device can perform the target detection method described in the foregoing embodiments. The device may be configured in a terminal device to perform the target detection on the scene image of the scene. The terminal device in the embodiments of the present disclosure may be any hardware device capable of data processing, such as a smart phone, a tablet computer, a robot, a wearable device such as a head mounted mobile device.

In an example embodiment, the identifying module 13 is configured to identify a horizontal plane or a vertical plane in the scene based on the three-dimensional point cloud, and to determine the horizontal plane or vertical plane as the supporting plane.

It should be noted that the implementation process and technical principle of the target detection device in this embodiment refer to the foregoing illustration of the target detection method in the embodiments of the first aspect, and details are not described herein again.

With the target detection device according to embodiments of the present disclosure, a scene image of a scene is acquired, a three-dimensional point cloud corresponding to the scene is acquired, a supporting plane in the scene is identified based on the three-dimensional point cloud, and a plurality of region proposals are generated based on the scene image and the supporting plane, further a target detection is performed on the plurality of region proposals to determine a target object to be detected in the scene image. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

Figure 8:
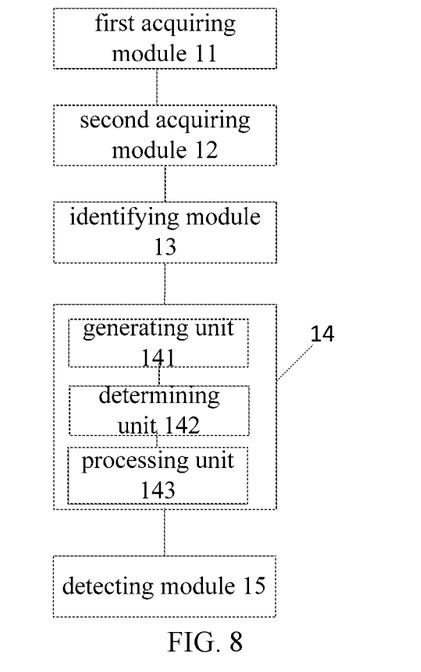
FIG. 8 is a block diagram of a target detection device according to another embodiment of the present disclosure.

The target detection device according to embodiments of the present disclosure is further described below in combination with FIG. 8. FIG. 8 is a block diagram of a target detection device according to another embodiment of the present disclosure.

As illustrated in FIG. 8, on the basis of FIG. 7, the processing module 14 includes: a generating unit 141, a determining unit 142, and a processing unit 143.

The generating unit 141 is configured to generate a plurality of sampling boxes.

The determining unit 142 is configured to determine a moving range of the plurality of sampling boxes based on a position and an orientation of the supporting plane.

The processing unit 143 is configured to control the plurality of sampling boxes to move by a preset step size in the moving range to generate a plurality of three-dimensional regions, and to project the plurality of three-dimensional regions to the scene image to form the plurality of region proposals.

In an example embodiment, the generating unit 141 is configured to acquire a target object of interest to the user, acquire parameters of the target object of interest, and generate parameters of the plurality of sampling boxes based on the parameters of the target object of interest.

It should be noted that the implementation process and technical principle of the target detection device in this embodiment refer to the foregoing illustration of the target detection method in the embodiments of the first aspect, and details are not described herein again.

With the target detection device according to embodiments of the present disclosure, a scene image of a scene is acquired, a three-dimensional point cloud corresponding to the scene is acquired, a supporting plane in the scene is identified based on the three-dimensional point cloud, and a plurality of region proposals are generated based on the scene image and the supporting plane, further a target detection is performed on the plurality of region proposals to determine a target object to be detected in the scene image. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

In order to realize the above embodiment, the present disclosure further provides a terminal device.

Figure 9:
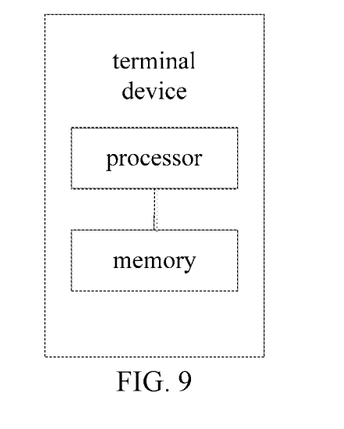
FIG. 9 is a block diagram of a terminal device according to an embodiment of the present disclosure.

FIG. 9 is a block diagram of a terminal device according to an embodiment of the present disclosure.

As illustrated in FIG. 9, the terminal device includes: a memory, a processor, and computer programs stored in the memory and executable by the processor. When the processor executes the computer programs, the target detection method according to embodiments described with reference to FIG. 1 is implemented.

It should be noted that the implementation process and technical principle of the terminal device in this embodiment refer to the foregoing illustration of the target detection method in the embodiments described with reference to FIG. 1, and details are not described herein again.

With the terminal device according to embodiments of the present disclosure, a scene image of a scene is acquired, a three-dimensional point cloud corresponding to the scene is acquired, a supporting plane in the scene is identified based on the three-dimensional point cloud, and a plurality of region proposals are generated based on the scene image and the supporting plane, further a target detection is performed on the plurality of region proposals to determine a target object to be detected in the scene image. Therefore, the generated region proposals are more accurate, and the number of the generated region proposals is greatly reduced, so that the computing time for subsequent feature extraction and other operations on the region proposals is reduced, less computing resource is consumed, thereby saving the computing time and computing resource for the target detection, and improving the efficiency of the target detection.

In order to realize the above embodiment, the present disclosure further provides a computer readable storage medium, storing computer programs therein. When the computer programs are executed by a processor, the target detection method according to embodiments of the first aspect is implemented.

In order to realize the above embodiment, the present disclosure further provides computer programs. When the computer programs are executed by a processor, the target detection method according to embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure.

In addition, terms such as "first" and "second" are used herein for purposes of description and are not intended to indicate or imply relative importance or significance. Thus, the feature defined with "first" and "second" may comprise one or more this feature.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A target detection method, comprising:

acquiring a scene image of a scene;

acquiring a three-dimensional point cloud corresponding to the scene;

identifying a supporting plane in the scene based on the three-dimensional point cloud;

generating a plurality of region proposals for a target object to be detected based on the scene image and the supporting plane; and performing a target detection on the plurality of region proposals to determine the target object to be detected in the scene image, wherein generating the plurality of region proposals for the target object to be detected based on the scene image and the supporting plane, comprises:
generating a plurality of sampling boxes;
determining a moving range of the plurality of sampling boxes based on a position and an orientation of the supporting plane;
controlling the plurality of sampling boxes to move on the supporting plane by a preset step size in the moving range to generate a plurality of three-dimensional regions; and
projecting the plurality of three-dimensional regions to the scene image to form the plurality of region proposals;
wherein the plurality of sampling boxes and the supporting plane are three-dimensional virtual area.

2. The target detection method according to claim 1, wherein acquiring the three-dimensional point cloud corresponding to the scene, comprises:
scanning the scene by a simultaneous localization and mapping (SLAM) system to generate the three-dimensional point cloud corresponding to the scene.

3. The target detection method according to claim 1, wherein identifying the supporting plane in the scene based on the three-dimensional point cloud, comprises:
identifying a horizontal plane or a vertical plane in the scene based on the three-dimensional point cloud, and determining the horizontal plane or the vertical plane as the supporting plane.

4. The target detection method according to claim 1, wherein generating the plurality of sampling boxes, comprises:
acquiring a target object of interest to the user;
acquiring parameters of the target object of interest; and
generating parameters of the plurality of sampling boxes based on the parameters of the target object of interest.

5. The target detection method according to claim 1, wherein said identifying the supporting plane in the scene based on the three-dimensional point cloud comprises:
identifying the supporting plane in the scene based on the three-dimensional point cloud by a Random Sample Consensus (RANSAC) algorithm, the three-dimensional point cloud being an input of the RANSAC algorithm.

6. The target detection method according to claim 1, wherein the supporting plane is a plane used to place actual objects or virtual objects in the scene.

7. A terminal device, comprising: a memory, a processor, and computer programs stored in the memory and executable by the processor, wherein the processor is configured to execute the computer programs to:
acquire a scene image of a scene;
acquire a three-dimensional point cloud corresponding to the scene;
identify a supporting plane in the scene based on the three-dimensional point cloud;
generate a plurality of region proposals for a target object to be detected based on the scene image and the supporting plane; and
perform a target detection on the plurality of region proposals to determine the target object to be detected in the scene image,
wherein the processor is further configured to execute the computer programs to:
generate a plurality of sampling boxes;
determine a moving range of the plurality of sampling boxes based on a position and an orientation of the supporting plane;
control the plurality of sampling boxes to move on the supporting plane by a preset step size in the moving range to generate a plurality of three-dimensional regions; and
project the plurality of three-dimensional regions to the scene image to form the plurality of region proposals;
wherein the plurality of sampling boxes and the supporting plane are three-dimensional virtual area.

8. The terminal device according to claim 7, wherein the processor is further configured to execute the computer programs to:
scan the scene by a simultaneous localization and mapping (SLAM) system to generate the three-dimensional point cloud corresponding to the scene.

9. The terminal device according to claim 7, wherein the processor is further configured to execute the computer programs to:
identify a horizontal plane or a vertical plane in the scene based on the three-dimensional point cloud, and determine the horizontal plane or the vertical plane as the supporting plane.

10. The terminal device according to claim 7, wherein the processor is further configured to execute the computer programs to:
acquire a target object of interest to the user;
acquire parameters of the target object of interest; and
generate parameters of the plurality of sampling boxes based on the parameters of the target object of interest.

11. The terminal device according to claim 7, wherein the processor is further configured to execute the computer programs to:
identify the supporting plane in the scene based on the three-dimensional point cloud by a Random Sample Consensus (RANSAC) algorithm, the three-dimensional point cloud being an input of the RANSAC algorithm.

12. The terminal device according to claim 7, wherein the supporting plane is a plane used to place actual objects or virtual objects in the scene.

13. A non-transitory computer readable storage medium, storing computer programs therein, wherein the computer programs, when executed by a processor, cause the processor to:
acquire a scene image of a scene;
acquire a three-dimensional point cloud corresponding to the scene;
identify a supporting plane in the scene based on the three-dimensional point cloud;
generate a plurality of region proposals for a target object to be detected based on the scene image and the supporting plane; and
perform a target detection on the plurality of region proposals to determine the target object to be detected in the scene image,
wherein the computer programs, when executed by a processor, further cause the processor to:
generate a plurality of sampling boxes;
determine a moving range of the plurality of sampling boxes based on a position and an orientation of the supporting plane;

control the plurality of sampling boxes to move on the supporting plane by a preset step size in the moving range to generate a plurality of three-dimensional regions; and project the plurality of three-dimensional regions to the scene image to form the plurality of region proposals;

wherein the plurality of sampling boxes and the supporting plane are three-dimensional virtual area.

14. The non-transitory computer readable storage medium according to claim 13, wherein the computer programs, when executed by a processor, further cause the processor to:

scan the scene by a simultaneous localization and mapping (SLAM) system to generate the three-dimensional point cloud corresponding to the scene.

15. The non-transitory computer readable storage medium according to claim 13, wherein the computer programs, when executed by a processor, further cause the processor to:

identify a horizontal plane or a vertical plane in the scene based on the three-dimensional point cloud, and determine the horizontal plane or the vertical plane as the supporting plane.

16. The non-transitory computer readable storage medium according to claim 13, wherein the computer programs, when executed by a processor, further cause the processor to:

acquire a target object of interest to the user;

acquire parameters of the target object of interest; and generate parameters of the plurality of sampling boxes based on the parameters of the target object of interest.

17. The target detection method according to claim 1, wherein the plurality of region proposals are located on the supporting plane.

* * * * *